United States Patent
Eilert et al.

(10) Patent No.: US 11,755,884 B2
(45) Date of Patent: Sep. 12, 2023

(54) DISTRIBUTED MACHINE LEARNING WITH PRIVACY PROTECTION

(71) Applicant: Micron Technology, Inc., Boise, ID (US)

(72) Inventors: Sean Stephen Eilert, Penryn, CA (US); Shivasankar Gunasekaran, Folsom, CA (US); Ameen D. Akel, Rancho Cordova, CA (US); Kenneth Marion Curewitz, Cameron Park, CA (US); Hongyu Wang, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 171 days.

(21) Appl. No.: 16/545,813

(22) Filed: Aug. 20, 2019

(65) Prior Publication Data

US 2021/0056387 A1 Feb. 25, 2021

(51) Int. Cl.
  *G06N 3/04* (2023.01)
  *G06N 3/045* (2023.01)
  *G06N 20/20* (2019.01)
  *G06N 3/048* (2023.01)

(52) U.S. Cl.
  CPC ............. *G06N 3/045* (2023.01); *G06N 3/048* (2023.01); *G06N 20/20* (2019.01)

(58) Field of Classification Search
  CPC ..... G06N 3/0454; G06N 20/00; G06N 3/0481
  USPC .......................................................... 706/15
  See application file for complete search history.

(56) References Cited

U.S. PATENT DOCUMENTS

| 8,250,503 | B2 | 8/2012 | Vorbach et al. |
| 8,686,549 | B2 | 4/2014 | Vorbach |
| 8,819,505 | B2 | 8/2014 | Vorbach et al. |
| 8,914,590 | B2 | 12/2014 | Vorbach et al. |
| 9,245,188 | B2 | 1/2016 | Han |

(Continued)

FOREIGN PATENT DOCUMENTS

| CN | 107368076 | 11/2017 |
| JP | 2017126112 | 7/2017 |
| WO | 2019092439 | 5/2019 |

OTHER PUBLICATIONS

Cloudera et al., "Federated learning: distributed machine learning with data locality and privacy", Cloudera Fast Forward Labs, Nov. 14, 2018 (Year: 2018).*

(Continued)

*Primary Examiner* — Tsu-Chang Lee
(74) *Attorney, Agent, or Firm* — Greenberg Traurig

(57) ABSTRACT

A system having multiple devices that can host different versions of an artificial neural network (ANN). In the system, changes to local versions of the ANN can be combined with a master version of the ANN. In the system, a first device can include memory that can store the master version, a second device can include memory that can store a local version of the ANN, and there can be many devices that store local versions of the ANN. The second device (or any other device of the system hosting a local version) can include a processor that can train the local version, and a transceiver that can transmit changes to the local version generated from the training. The first device can include a transceiver that can receive the changes to a local version, and a processing device that can combine the received changes with the master version.

20 Claims, 5 Drawing Sheets

(56) References Cited

U.S. PATENT DOCUMENTS

| | | | |
|---|---|---|---|
| 9,413,779 B2 | 8/2016 | Vasseur et al. |
| 9,450,978 B2 | 9/2016 | Vasseur et al. |
| 9,503,466 B2 | 11/2016 | Vasseur et al. |
| 9,521,158 B2 | 12/2016 | Di Pietro et al. |
| 9,563,854 B2 | 2/2017 | Cruz Mota et al. |
| 9,672,734 B1 | 6/2017 | Ratnasingam |
| 9,751,534 B2 | 9/2017 | Fung et al. |
| 9,947,145 B2 | 4/2018 | Wang et al. |
| 10,001,760 B1 | 6/2018 | Hoffmann et al. |
| 10,007,269 B1 | 6/2018 | Gray |
| 10,019,654 B1 | 7/2018 | Pisoni |
| 10,217,028 B1 | 2/2019 | Wang et al. |
| 10,229,357 B2 | 3/2019 | Jin et al. |
| 10,254,760 B1 | 4/2019 | Abeloe |
| 10,275,851 B1 * | 4/2019 | Zhao | G06F 9/5044 |
| 10,296,004 B2 | 5/2019 | Nishi |
| 10,311,312 B2 | 6/2019 | Yu et al. |
| 10,366,502 B1 | 7/2019 | Li |
| 10,459,444 B1 | 10/2019 | Kentley-klay |
| 10,599,546 B1 | 3/2020 | Walther et al. |
| 10,611,379 B2 | 4/2020 | Olabiyi et al. |
| 10,672,200 B2 | 6/2020 | Wang et al. |
| 10,678,244 B2 | 6/2020 | Iandola et al. |
| 10,713,955 B2 | 7/2020 | Tong et al. |
| 10,733,506 B1 | 8/2020 | Ogale et al. |
| 10,855,485 B1 | 12/2020 | Zhou et al. |
| 10,915,663 B1 | 2/2021 | Ferrer et al. |
| 10,994,741 B2 | 5/2021 | Zhou et al. |
| 11,003,992 B2 * | 5/2021 | Wesolowski | G06N 3/10 |
| 11,120,353 B2 | 9/2021 | Olabiyi et al. |
| 11,188,821 B1 | 11/2021 | Kalakrishnan et al. |
| 11,328,210 B2 | 5/2022 | Mondello et al. |
| 11,392,796 B2 | 7/2022 | Curewitz et al. |
| 2013/0346350 A1 | 12/2013 | Subramanian et al. |
| 2014/0201126 A1 | 7/2014 | Zadeh et al. |
| 2015/0026108 A1 | 1/2015 | Portegys et al. |
| 2015/0038608 A1 | 2/2015 | Kim et al. |
| 2015/0100530 A1 | 4/2015 | Mnih et al. |
| 2015/0106308 A1 | 4/2015 | Harrison et al. |
| 2015/0161454 A1 | 6/2015 | Han |
| 2015/0193693 A1 | 7/2015 | Vasseur et al. |
| 2015/0193694 A1 | 7/2015 | Vasseur et al. |
| 2015/0193695 A1 | 7/2015 | Cruz Mota et al. |
| 2015/0193696 A1 | 7/2015 | Vasseur et al. |
| 2015/0193697 A1 | 7/2015 | Vasseur et al. |
| 2015/0195145 A1 | 7/2015 | Di Pietro et al. |
| 2015/0195146 A1 | 7/2015 | Di Pietro et al. |
| 2015/0254555 A1 | 9/2015 | Williams, Jr. et al. |
| 2015/0324686 A1 | 11/2015 | Julian et al. |
| 2016/0020943 A1 | 1/2016 | Diab et al. |
| 2016/0078339 A1 | 3/2016 | Li et al. |
| 2016/0104047 A1 | 4/2016 | Sibiryakov |
| 2017/0008168 A1 | 1/2017 | Weng et al. |
| 2017/0008521 A1 | 1/2017 | Braunstein et al. |
| 2017/0132527 A1 | 5/2017 | Ahn et al. |
| 2017/0169208 A1 | 6/2017 | Jantz et al. |
| 2017/0200284 A1 | 7/2017 | Lee et al. |
| 2017/0242436 A1 | 8/2017 | Creusot |
| 2017/0262735 A1 | 9/2017 | Ros Sanchez et al. |
| 2017/0293808 A1 | 10/2017 | Jain et al. |
| 2017/0305434 A1 | 10/2017 | Ratnasingam |
| 2017/0337487 A1 | 11/2017 | Nock et al. |
| 2018/0018590 A1 | 1/2018 | Szeto et al. |
| 2018/0018775 A1 | 1/2018 | Piekniewski et al. |
| 2018/0025268 A1 | 1/2018 | Teig et al. |
| 2018/0053071 A1 | 2/2018 | Chen et al. |
| 2018/0068206 A1 | 3/2018 | Pollach et al. |
| 2018/0082137 A1 | 3/2018 | Melvin et al. |
| 2018/0157920 A1 | 6/2018 | Hu |
| 2018/0164825 A1 | 6/2018 | Matus et al. |
| 2018/0173971 A1 | 6/2018 | Jia et al. |
| 2018/0174023 A1 | 6/2018 | Imam et al. |
| 2018/0174457 A1 | 6/2018 | Taylor |
| 2018/0182187 A1 | 6/2018 | Tong et al. |
| 2018/0188733 A1 | 7/2018 | Iandola et al. |
| 2018/0268266 A1 | 9/2018 | Sohn et al. |
| 2018/0284735 A1 | 10/2018 | Celia et al. |
| 2018/0285735 A1 | 10/2018 | Baum et al. |
| 2018/0292825 A1 | 10/2018 | Smolyanskiy et al. |
| 2018/0300964 A1 | 10/2018 | Lakshamanan et al. |
| 2018/0365595 A1 | 12/2018 | Zhou |
| 2019/0019082 A1 | 1/2019 | Dasgupta et al. |
| 2019/0034762 A1 | 1/2019 | Hashimoto |
| 2019/0035113 A1 | 1/2019 | Salvi et al. |
| 2019/0050624 A1 | 2/2019 | Chai et al. |
| 2019/0050746 A1 | 2/2019 | Sanketi et al. |
| 2019/0082185 A1 | 3/2019 | Satavalekar et al. |
| 2019/0108651 A1 | 4/2019 | Gu et al. |
| 2019/0113927 A1 | 4/2019 | England et al. |
| 2019/0114530 A1 | 4/2019 | Nishida et al. |
| 2019/0114672 A1 | 4/2019 | Jacobs et al. |
| 2019/0121673 A1 | 4/2019 | Gold et al. |
| 2019/0122006 A1 | 4/2019 | Hurry et al. |
| 2019/0122109 A1 | 4/2019 | Busch et al. |
| 2019/0138889 A1 | 5/2019 | Jiang et al. |
| 2019/0147254 A1 | 5/2019 | Bai et al. |
| 2019/0147298 A1 | 5/2019 | Rabinovich et al. |
| 2019/0147331 A1 | 5/2019 | Arditi |
| 2019/0163737 A1 | 5/2019 | Zhou et al. |
| 2019/0171187 A1 | 6/2019 | Celia et al. |
| 2019/0187706 A1 | 6/2019 | Zhou et al. |
| 2019/0187707 A1 | 6/2019 | Zheng et al. |
| 2019/0204088 A1 | 7/2019 | Haque et al. |
| 2019/0205744 A1 | 7/2019 | Mondello et al. |
| 2019/0205765 A1 | 7/2019 | Mondello et al. |
| 2019/0251396 A1 | 8/2019 | Geraci et al. |
| 2019/0258251 A1 | 8/2019 | Ditty et al. |
| 2019/0272433 A1 | 9/2019 | Yu et al. |
| 2019/0279028 A1 | 9/2019 | Wang et al. |
| 2019/0354708 A1 | 11/2019 | Fisher et al. |
| 2020/0005135 A1 | 1/2020 | Che |
| 2020/0019794 A1 | 1/2020 | Engelcke et al. |
| 2020/0026283 A1 | 1/2020 | Barnes et al. |
| 2020/0068250 A1 | 2/2020 | Bhooi et al. |
| 2020/0209810 A1 | 7/2020 | Bazhenov et al. |
| 2020/0242466 A1 | 7/2020 | Mohassel et al. |
| 2020/0257301 A1 | 8/2020 | Weiser et al. |
| 2020/0279129 A1 | 9/2020 | Batchelor et al. |
| 2020/0371892 A1 | 11/2020 | Huang et al. |
| 2020/0380629 A1 * | 12/2020 | Monteil | G06Q 10/06315 |
| 2020/0401136 A1 | 12/2020 | Iandola et al. |
| 2020/0411737 A1 | 12/2020 | Barnes et al. |
| 2021/0042628 A1 | 2/2021 | Zhou et al. |
| 2021/0042630 A1 | 2/2021 | Roberts et al. |
| 2021/0056350 A1 | 2/2021 | Curewitz et al. |
| 2021/0056405 A1 | 2/2021 | Bradshaw et al. |
| 2020/0604464 | 6/2021 | Jobling et al. |
| 2022/0327428 A1 * | 10/2022 | Sun | H04L 67/10 |

OTHER PUBLICATIONS

International Search Report and Written Opinion, PCT/US2020/046155, dated Nov. 20, 2020.

International Search Report and Written Opinion, PCT/US2020/046159, dated Nov. 20, 2020.

International Search Report and Written Opinion, PCT/US2018/063669, dated Mar. 25, 2019.

Bojarski et al., "End to End Learning for Self-Driving Cars." arXiv:1604.07316v1, Apr. 25, 2016.

Fridman et al., "MIT Autonomous Vehicle Technology Study: Large-Scale Deep Learning Based Analysis of Driver Behavior and Interaction with Automation." arXiv:1711.06976v1, Nov. 19, 2017.

International Search Report and Written Opinion, PCT/US2020/046157, dated Jan. 15, 2021.

Ji Wang, et al., "Not Just Privacy: Improving Performance of Private Deep Learning in Mobile Cloud," arXiv:1809.03428v3, Jan. 5, 2019.

Linshan Jiang, et al., "Differentially Private Collaborative learning for the IoT Edge," EWSN '19: Proceedings of the 2019 International Conference on Embedded Wireless Systems and networks, Mar. 2019.

(56) References Cited

OTHER PUBLICATIONS

Pan et al., "Virtual to Real Reinforcement Learning for Autonomous Driving." arXiv:1704.03952v3, May 11, 2017.
Santana et al., "Learning a Driving Simulator." arXiv:1608.01230v1, Aug. 3, 2016.
Stem et al., "Dissipation of stop-and-go waves via control of autonomous vehicles: Field experiemnts." ARxIV:1705.01693V1, May 4, 2017.
Teichmann et al., "MultiNet: Real-time Joint Semantic Reasoning for Autonomous Driving." arXiv:1612.07695v1, Dec. 22, 2016.
Tianwei Zhang, et al., "Privacy-preserving Machine Learning through Data Obfuscation," arXiv: 1807.01860v2, Jul. 13, 2018.
Vishal Anjaiah Gujjary, et al., "Letters: A neural network approach for data masking," Neurocomputing 2011, vol. 74, No. 9, Apr. 2011.
Atoum, et al. "Monocular Video-Based Trailer Coupler Detection Using Multiplexer Convolutional Neural Network." IEEE International Conference on Computer Vision, Oct. 2017.
Chen, et al. "Brain-Inspired Cognitive Model with Attention for Self-Driving Cars." Feb. 19, 2017.
Eraqi, et al. "End-toEnd Deep Learning for Steering Autonomous Vehicles Considering Temporal Dependencies." 31st Conference on Neural Information Processing Systems, Nov. 22, 2017.
Hou, et al. "Fast Recurrent Fully Convolutional networks for Direct Perception in Autonomous Driving." Nov. 20, 2017.
Liu, et al. "A Unified Cloud Platform for Autonomous Driving." IEEE Computer Society, Dec. 18, 2017.
Pan, et al. "Agile Off-Road Autonomous Driving Using End-to-End Deep Imitation Learning." Sep. 21, 2017.
Sallab, et al. "Meta Learning Framework for Automated Driving." Jun. 11, 2017.
Shapiro, Danny. "Accelerating the Race to Autonomous Cars." Aug. 2016.
Wang, et al. "Reconfigurable Processor for Deep Learning in Autonomous Vehicles." International Telecommunication Union, Sep. 2017.
Jin et al., "How to scale distributed deep learning?" arXiv1611.04581v1, Nov. 14, 2016.
Olabiyi et al., "Driver Action Prediction Using Deep (Bidirectional) Recurrent Neural Network." arXiv:1706.02257, Jun. 7, 2017.
Skende, Andi, "Introducing 'Parker' Next-Generation Tegra System-On-Chip." Aug. 2016.
Wu et al., "SqueezeDet: Unified, Small, Low Power Fully Convolutional Neural Networks for Real-Time Object Detection for Autonomous Driving." arXiv:1612.01051v3, Nov. 29, 2017.
Barnes, et al. "Driven to Distraction: Self-Supervised Distractor Learning for Robust Monocular Visual Odometry in Urban Environments." arXiv: 1711.06623v1, Nov. 17, 2017.
Barnes, et al. "Find Your Own Way: Weakly-Supervised Segmentation of Path Proposals for Urban Autonomy." arXiv:1610.01238v3, Nov. 17, 2017.
Kahn, et al. "Self-supervised Deep Reinforcement Learning with Generalized Computation Graphs for Robot Navigation." arXiv:1709.10489v2, Nov. 30, 2017.
Pan, et al. "Spatial As Deep: Spatial CNN for Traffic Scene Understanding." arXiv:1712.06080v1, Dec. 17, 2017.
Richter, et al. "Safe Visual navigation via Deep learning and Novelty Detection." Robotics: Science and Systems XIII, Jul. 12, 2017.
Wang, et al. "Understanding Convolution for Semantic Segmentation." arXIV:1702.08502v2, Nov. 9, 2017.
Wikipedia. "Self-supervised learning." Retrieved from the Internet <https://en.wikipedia.org/wiki/Self-supervised_learning> on May 31, 2022.
Aljosa Osep, et al. "Large-Scale Object Discovery and Detector Adaptation from Unlabeled Video." arXiv:1712.08832v1, Dec. 23, 2017.
Chelsea Finn, et al. "Generalizing Skills with Semi-Supervised Reinforcement Learning." Conference paper at ICLR, 2017.
David Stavens, et al. "A Self-Supervised Terrain Roughness Estimator for Off-Road Autonomous Driving." arXiv:1206.6872, Jun. 27, 2012.
Evan Shelhamer, et al. "Loss is its own Reward: Self-Supervision for Reinforcement Learning." arXiv:1612.07307, Mar. 9, 2017.
Guy Rosman, et al. "Hybrid Control and Learning with Coresets for Autonomous Vehicles." IEEE/RSJ International Conference on Intelligent Robots and Systems (IROS), IEEE, Sep. 24-28, 2017.
Junhong Xu, et al. "Avoidance of Manual Labeling in Robotic Autonomous Navigation Through Multi-Sensory Semi-Supervised Learning." arXiv:1709.07911v3, Oct. 9, 2017.
Miguel A. Bautista, et al. "Learning Where to Drive by Watching Others." German Conference on Pattern Recognition, Aug. 15, 2017.
Mohammed Abdulla Yousuf, et al. U.S. "Systems and Methods for Safe and Reliable Autonomous Vehicles." U.S. Appl. No. 62/584,549, filed Nov. 10, 2017.
Xiaohang Zhan. "Mix-and-Match Tuning for Slef-Supervised Semantic Segmentation." Association for the Advancement of Artificial Intelligence (AAAI), 2018.
Yiran Zhong, et al. "Self-Supervised Learning for Stereo matching with Self-Improving Ability." arXiv:1709.00930v1, Sep. 4, 2017.
Ashok, Ashwin, et al., "Enabling Vehicular Applications using Cloud Services through Adaptive Computation Offloading." ACM, Sep. 11, 2015.
Liebig, Thomas, et al., "Distributed Traffic Flow Prediction with Label Proprotions: From in-Network towards High Performance Computation with MPI." Proceedings of the 2nd International Workshop on Mining Urban Data, 2015.
Sheller, Micah J., et al., "Multi-Institutional Deep Learning Modeling Without Sharing Patient Data: A Feasibility Study on Brain Tumor Segmentation." arXiv.org, Retrieved from the Internet on Apr. 17, 2023 <https://arxiv.org/pdf/1810.04304v2.pdf>, 2018.
Zhang, Tianwei, et al., "Privacy-preserving Machine Learning through Data Obfuscation." Retrieved from the Internet <https://arxiv.org/abs/1807.01860v2> on Mar. 23, 2023, Jul. 2018.
Gujjary, Vishal Anjaiah, et al., "A Neural Network Approach for Data Masking." ResearchGate, Sep. 2, 2010.

\* cited by examiner

DISTRIBUTED MACHINE LEARNING WITH PRIVACY PROTECTION

FIELD OF THE TECHNOLOGY

At least some embodiments disclosed herein relate to distributed machine learning with data privacy protection in general, and more particularly, to distributed artificial neural networks with data privacy protection.

BACKGROUND

Artificial neural networks (ANN) are computing systems that can learn to perform tasks without being programmed with instructions for specific operations. An ANN is based on a set of connected nodes or artificial neurons, which are somewhat analogous to neurons in a biological brain. Each connection between nodes can transmit a signal from one artificial neuron to another, and an artificial neuron that receives a signal can process it.

Usually, an ANN is implemented by a signal at a connection (or edge) between artificial neurons being a real number, and the output of each artificial neuron being computed by a non-linear function of the sum of its inputs. Artificial neurons and edges usually have a weight that adjusts as learning by the ANN or training of the ANN proceeds. The weight increases or decreases the strength of the signal at an edge. An artificial neuron can also have a threshold in which a signal is only sent from the artificial neuron if the aggregate signal exceeds the threshold. Usually, artificial neurons are grouped into layers (such as an input layer, one or more middle layers, and an output layer), and each layer can provide a different transformation on inputs to the layer.

With the increasing use of complex artificial neural networks, such as deep neural networks, and the desire to increase the effectiveness of such networks, complexities and challenges have been met by distributing training of artificial neural networks using multiple processors and/or distributed computing. However, with the use of multiple processors or distributing computing there are data privacy concerns (e.g., concerns that the data is authentic) as well as network performance concerns (e.g., concerns with network performance limiting ability for a neural network to meet performance needs of an application).

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
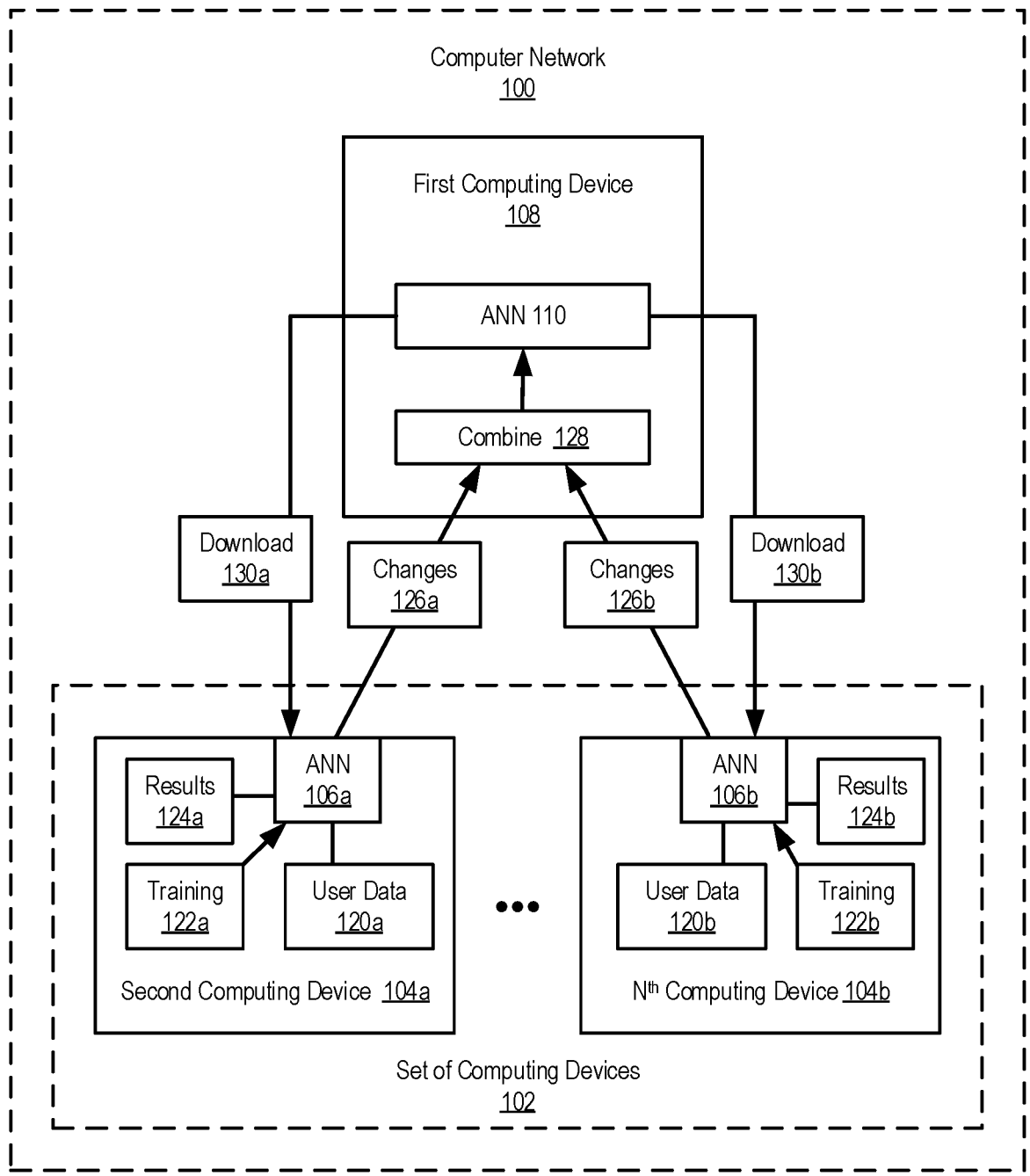
FIGS. 1 and 2 illustrate an example computer network 100 in a configuration to implement combining differently trained versions of an artificial neural network (ANN) into a master version of the ANN, in accordance with some embodiments of the present disclosure.

At least some aspects of the present disclosure are directed to distributed machine learning with data privacy protection in general, and more particularly, to distributed artificial neural networks with data privacy protection. Also, at least some aspects of the present disclosure are directed to a computer network that can be configured to implement combining differently trained versions of an artificial neural network (ANN) into a master version of the ANN.

In some embodiments, disclosed herein is a system that can have multiple computing devices that can host different versions of an ANN. Each computing device of the system can host its own version of the ANN. For example, a first device can host a master version of the ANN, and a second device and other devices of the system can host local versions of the ANN. In the system, changes to local versions of the ANN (such as due to training) can be combined with the master version of the ANN to update the master version of the ANN. In the system, the first device can include memory that can store the master version, and the second device (or another device of the system hosting a local version of the ANN) can include memory that can store a local version. The second device (or any other device of the system hosting a local version of the ANN) can include a processor that can train its local version of the ANN, and a transceiver that can transmit changes to the local version generated from the training of the local version. The first device can include a transceiver that can receive the changes to a local version, and a processor that can combine the received changes to the local version with the master version of the ANN.

In some embodiments, one of the devices hosting a local version of the ANN can input user data, stored in its memory, into the local version of the ANN to use and train the local version of the ANN. For example, this can occur in a mobile device of the user. User data, which may include sensitive or private information, is not shared with other devices in its use with the ANN. To put it another way, the machine learning for the ANN can occur locally and privately in that the user data is not shared with other devices and is secured in the device of the user. However, the changes or updates to the local version of the ANN as well as results outputted from the ANN can be communicated to other devices hosting other versions of the ANN, such as a device hosting a master version of the ANN.

In some embodiments, one or more devices hosting the master version of the ANN can be part of a cloud computing environment. And, in such embodiments, by inputting the user data only in the device of the user the user data can be kept private from the devices of the cloud. But, the cloud can benefit from the changes in the local version of the ANN due to training of the local version based on the user data. The user data is not sent to the cloud to protect the privacy of the user. The user data is used to locally train a local version of the ANN on the device of the user only. For example, the user data is only used to train a local version of the ANN on a user's mobile device (e.g., the user's smart phone, tablet, etc.).

The changes to a local version of the ANN as a result of the local training can be transmitted to other devices for combining the changes with other versions of the ANN. For example, the changes can be transmitted to the cloud to be combined with a master version of the ANN. In such an example, the cloud combines the changes received from the devices of different users to update the master version of the ANN in the cloud such that the master version is more generic or universal and becomes more and more accurate over time.

In some embodiments, the master version of ANN can be downloaded to the individual devices of users to update and improve the local versions of the ANN stored on the devices. This can improve the accuracy of the locally stored versions of the ANN in areas of the ANN that may have not been improved by training locally alone. Also, the downloaded master version of the ANN can be further trained locally for a customized version of the ANN for the user.

In general, in the computer network that can be configured to implement combining differently trained versions of the ANN into a master version of the ANN, devices that host the differently trained version of the ANN can perform local training to avoid the transmission of user data. In that only the changes to the local trained versions of the ANN can be transmitted over a network communicatively coupling the devices. A central device, server, or cloud can then receive the trained results via the network and combine those trained results from different devices with a master version of the ANN. Since the central device, server, or cloud does not have the user data (inputs to local versions of ANN), exposure of the user data to the central device, server, or cloud and the network can be avoided.

The computer network that can be configured to implement combining differently trained versions of the ANN into a master version of the ANN can protect user privacy while still keeping the benefit of training an ANN using the data of various users. In some embodiments, less sensitive data can be sent to the central device, server, or cloud after local training by a device of a user. The local training can convert the sensitive data on the user device into changes in the ANN such that the sensitive data cannot be recovered from the changes transmitted to the central device, server, or cloud.

The ANN updated in the computer network can be in the form of updating neuron attributes and/or connectivity. Changes to versions of the ANN can be combined with the master version of the ANN at the central device, server, or cloud such as by combining neuron attributes (e.g., weights for different inputs and thresholds) of the versions of the ANN. The combining can be done by taking averages for each attribute in the changes or in general and/or weighted averages for each attribute in the changes or in general. Weights for a weighted average in combining the changes from different contributors (e.g., different user devices) can be configured on some measurements of sample sizes of the user data. For example, if a user device's ANN is trained with more user data, its changes can be given more weight.

Also, connectivity changes can be combined via weights on outputs from neurons as inputs to other neurons (e.g., no connection is equivalent to zero weight). However, minor changes from different contributors may significantly increase connections among neurons. This is not a problem when original network is fully connected, but can be a problem when the original network is sparsely connected. Thus, combining connectivity can dependent on the embodiment.

It is to be understood that the changes to a local version of an ANN described herein that are transmitted from the user devices to the central device, server, or cloud hosting the master version of the ANN can be in the form of the entire changed ANN, parts of the changed ANN, or just the changed parameters in the changed ANN. Also, in some embodiments, the central device, server, or cloud hosting the master version of the ANN can limit what the user devices can change via local training, and this can reduce the data traffic and may also reduce the effectiveness of training. Also, it is to be understood that a peer-to-peer network can implement the computer network that can be configured to implement combining differently trained versions of the ANN into a master version of the ANN. In such examples, merely a first selected device hosts the master version of the ANN for processing and the other devices of the peer-to-peer network host the other versions (e.g., local versions) of the ANN for processing.

Figure 2:
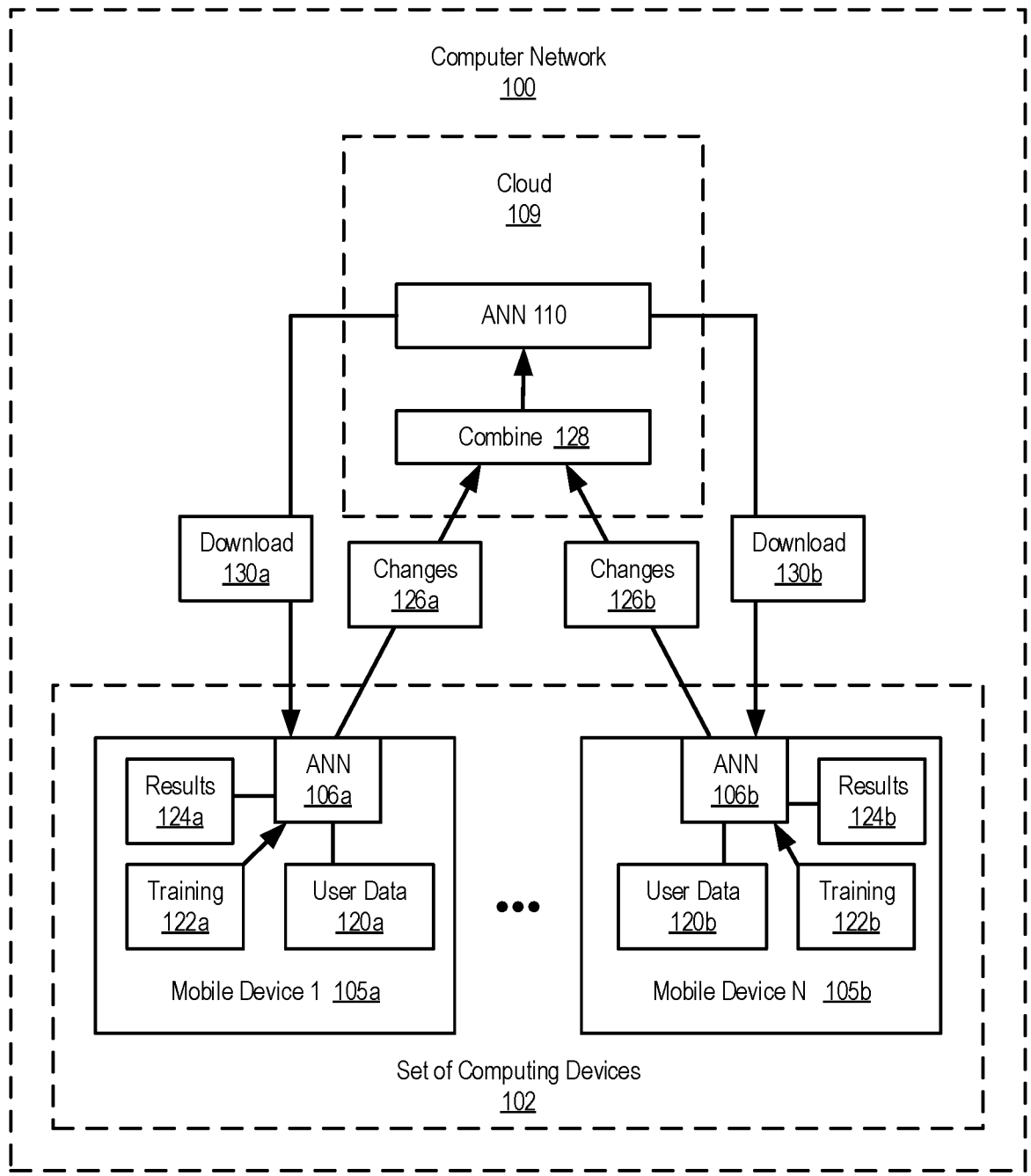

FIGS. 1 and 2 illustrate an example computer network 100 in a configuration to implement combining differently trained versions of an ANN into a master version of the ANN, in accordance with some embodiments of the present disclosure.

In FIG. 1, the computer network 100 is shown including a set of computing devices 102. The set of computing devices 102 can include one or more of any type of computing device capable of hosting and executing a version of an ANN, such as any type of mobile device, personal computer, or smart device that is capable of hosting and executing a version of an ANN (e.g., see second computing device 104a and Nth computing device 104b). Each computing device of the set of computing devices 102 can host and execute a local version of an ANN (e.g., see second computing device 104a and Nth computing device 104b having respective local versions of an ANN 106a and 106b).

The computer network 100 is also shown including a first computing device 108. The first computing device 108 can be a single computing device or multiple computing devices distributed over a network, such as distributed over a network of a cloud computing environment. The single computing device or the multiple computing devices embodied by first computing device 108 can include a master version of an ANN 110. The first computing device 108 can be the central device, server, or cloud or a selected device in a peer-to-peer computing network depending on the implementation of the computer network 100.

To put it another way, FIG. 1 illustrates a computer network 100 including the set of computing devices 102 having networked computing devices (e.g., see computing devices 104a and 104b), wherein each networked computing devices stores and uses a separate local version of an ANN (e.g., see the local versions of the ANN 106a and 106b). The computer network 100 also includes the first computing device 108 (which can be part of a cloud or another type of distributed computing network). The first computing device 108 includes the master version of the ANN 110.

The local copies of the ANN (e.g., see the local versions of the ANN 106a and 106b) can be used with user data (e.g., see user data 120a and 120b). Also, user data can be used in training the local copies of the ANN (e.g., see training 122a and 122b). The results of a local version of the ANN (e.g., see results 124a and 124b) can be outputted from the local version of the ANN based on the inputted user data inputted into the local version of the ANN (e.g., see user data 120a and 120b). The training of the local copies of the ANN (e.g., see the local versions of the ANN 106a and 106b) can result in changes to the local copies (e.g., see changes 126a and 126b). The changes to the local copies of the ANN (e.g., see changes 126a and 126b) can be transmitted from a device of the set of computing devices 102 and combined with the master version of the ANN (e.g., see the master version of the ANN 110) to update the master version (e.g., see combining 128). An updated master version of the ANN can then be downloaded by one or more devices of the set of computing devices 102 (e.g., see downloading 130a and 130b). The downloaded master version can replace a local version of the ANN or be combined with the local version of the ANN hosted by one of the devices of the set of computing devices 102.

As illustrated in FIG. 1, the user data (e.g., see user data 120a and 120b) as input for an ANN (e.g., see the local versions of the ANN 106*a* and 106*b*) is not sent to the first computing device having the master version of the ANN (e.g., see first computing device 108) to protect the privacy of the user. The user data is used to locally train (e.g., see training 122*a* and 122*b*) a local version of the ANN (e.g., see the local versions of the ANN 106*a* and 106*b*) on a device of the user (e.g., see computing devices 104*a* and 104*b*).

The changes (e.g., see changes 126*a* and 126*b*) to the ANN (e.g., see the local versions of the ANN 106*a* and 106*b*) as a result of the local training (e.g., see training 122*a* and 122*b*) are transmitted to the device having the master version of the ANN (e.g., see first computing device 108). The device having the master version of the ANN combines the changes received from the devices of different users having the different and local versions of the ANN (e.g., see computing devices 104*a* and 104*b*) to update the master version of the ANN (e.g., see the master version of the ANN 110) in the first computing device 108 (e.g., see combining 128), such that the master version is generic and becomes more and more accurate over time.

The master version of the ANN (e.g., see the master version of the ANN 110) can be downloaded to the individual user devices (e.g., see computing devices 104*a* and 104*b*) to update the user devices capability to benefit from advances in areas that may not have been trained locally (e.g., see downloading 130*a* and 130*b*). Also, the downloaded ANN can be further trained locally for a customized version of the ANN for the user (e.g., see training 122*a* and 122*b* combined with the downloading 130*a* and 130*b* respectively).

Not shown, the computer network 100 includes a communications network that includes a wide area network (WAN), a local area network (LAN), an intranet, an extranet, the Internet, and/or any combination thereof. The communications network can communicatively couple the devices of the set of computing devices 102 with each other and with other devices of the computer network 100 such as with the first computing device 108. The changes to versions of the ANN and downloads of the master version of the ANN mentioned herein (e.g., see changes 126*a* and 126*b* and downloading 130*a* and 130*b*) can be communicated or transmitted over the communications network of the computer network 100.

In some embodiments, a system (such as the computer network 100) includes a second computing device (such as the computing device 104*a* or 104*b*) that includes memory (such as main memory 508 and/or storage system 512 show in FIG. 5) configured to store a local version of the ANN (such as the local versions of the ANN 106*a* or 106*b*). In such embodiments, the second computing device includes a processing device (such as processor 506 show in FIG. 5), configured to train the local version of the ANN (such as training 122*a* or 122*b*). Also, the second computing device can include a transceiver (such as network interface 510) configured to transmit changes to the local version of the ANN (such as changes 126*a* or 126*b*) generated from the training of the local version of the ANN (such as training 122*a* or 122*b*).

In such embodiments, the system (such as the computer network 100) also includes a first computing device (such as first computing device 108) that includes memory (such as main memory 508 and/or storage system 512 show in FIG. 5) configured to store a master version of the ANN (such as the master version of the ANN 110). The first computing device can also include a transceiver (such as network interface 510) configured to receive, from the second computing device, changes to the local version of the ANN from training of the local version of the ANN. And, the first computing device can also include a processing device (such as processor 506 show in FIG. 5) configured to combine the received changes to the local version of the ANN with the master version of the ANN to generate an updated master version of the ANN.

In some embodiments, the computer network 100 can include an apparatus that can host and execute the master version of the ANN (e.g., see the first computing device 108). The apparatus can include memory (e.g., see main memory 508 and storage system 512 shown in FIG. 5) configured to store the master version of the ANN (e.g., see the master version of the ANN 110). The apparatus can also include a transceiver (e.g., see network interface 510 show in FIG. 5) configured to receive changes to a local version of the ANN (e.g., see changes 126*a* and 126*b*) from training of the local version of the ANN (e.g., see training 122*a* and 122*b*) hosted by another apparatus (e.g., see computing devices 104*a* and 104*b*). The apparatus can also include a processing device (e.g., see processor 506 shown in FIG. 5) configured to combine the received changes to the local version of the ANN (e.g., see changes 126*a* and 126*b*) with the master version of the ANN (e.g., see the master version of the ANN 110) to generate an updated master version of the ANN (e.g., see combining 128).

In such embodiments, the training of the local version of the ANN (e.g., see training 122*a* and 122*b*) can include inputting user data (e.g., see user data 120*a* and 120*b*) locally stored on the other apparatus (e.g., see computing devices 104*a* and 104*b*). And, in such examples, the user data locally stored on the other apparatus (e.g., see computing devices 104*a* and 104*b*) is not accessible by the apparatus (e.g. see first computing device 108). Further, at least some of the user data locally stored on the other apparatus can only be accessible by the other apparatus.

Also, in such embodiments, in the configuration to combine the neuron attributes of the local version of the ANN with the corresponding neuron attributes of the master version of the ANN, the processing device can be configured to generate an average for each neuron attribute of the local version in the changes and its corresponding attribute of the master version of the ANN. And, in the configuration to combine the neuron attributes of the local version of the ANN with the corresponding neuron attributes of the master version of the ANN, the processing device can be configured to update the corresponding attributes of the master version according to the generated averages (e.g., or replace the corresponding attributes of the master version with the generated averages).

Also, in such embodiments, the processing device can be configured to generate a predetermined weight for a neuron attribute based on a size of the user data locally stored on the other apparatus used for input for the training of the local version of the ANN. And, in the configuration to combine the neuron attributes of the local version of the ANN with the corresponding neuron attributes of the master version of the ANN, the processing device can be configured to generate a weighted average for each neuron attribute of the local version in the changes and its corresponding attribute of the master version according to a generated weight. And then afterwards, in the configuration to combine the neuron attributes of the local version of the ANN with the corresponding neuron attributes of the master version of the ANN, the processing device can be configured to update the corresponding attributes of the master version according to the generated weighted averages (e.g., or replace the corresponding attributes of the master version with the generated weighted averages).

Also, in such embodiments, in the configuration to combine the received changes to the local version of the ANN with the master version of the ANN (e.g., see combining 128), the processing device (e.g., see processor 506) can be configured to combine neuron attributes of the local version of the ANN (e.g., see the local versions of the ANN 106a and 106b) in the received changes (e.g., see changes 126a and 126b) with corresponding neuron attributes of the master version of the ANN (e.g., see the master version of the ANN 110). Further, in the configuration to combine the neuron attributes of the local version of the ANN with the corresponding neuron attributes of the master version of the ANN, the processing device can be configured to average weights for neuron inputs of the local version of the ANN with corresponding weights for neuron inputs of the master version of the ANN. Also, in the configuration to combine the neuron attributes of the local version of the ANN with the corresponding neuron attributes of the master version of the ANN, the processing device can be configured to average weights for neuron thresholds of the local version of the ANN with corresponding weights for neuron thresholds of the master version of the ANN. And, in the configuration to combine the neuron attributes of the local version of the ANN with the corresponding neuron attributes of the master version of the ANN, the processing device can be configured to average weights for neuron thresholds of the local version of the ANN with corresponding weights for neuron thresholds of the master version of the ANN as well as average weights for neuron inputs of the local version of the ANN with corresponding weights for neuron inputs of the master version of the ANN.

FIG. 2 is somewhat similar to FIG. 1 in that it shows computer network 100 in a configuration to implement combining differently trained versions of an ANN into a master version of the ANN. However, different from FIG. 1, FIG. 2 depicts specifically the set of computing devices 102 including mobile devices (e.g., see mobile devices 105a and 105b) hosting respective local versions of the ANN (e.g., see the local versions of the ANN 106a and 106b). Also, in FIG. 2, it is shown that a cloud computing environment (e.g., cloud computing environment 109) is hosting the master version of the ANN (e.g., see the master version of the ANN 110). In other words, FIG. 2 is a more specific implementation of the computer network shown in FIG. 1, where the first device 108 is or is part of a cloud computing environment 109 and the devices of the set of computing devices 102 are specifically mobile devices (e.g., see mobile devices 105a and 105b).

As illustrated in FIG. 2, the user data (e.g., see user data 120a and 120b) as input for an ANN (e.g., see the local versions of the ANN 106a and 106b) is not sent to the cloud computing environment having the master version of the ANN (e.g., see the cloud computing environment 109) to protect the privacy of the user. The user data is used to locally train (e.g., see training 122a and 122b) a local version of the ANN (e.g., see the local versions of the ANN 106a and 106b) on a mobile device of the user (e.g., see mobile devices 105a and 105b).

The changes (e.g., see changes 126a and 126b) to the ANN (e.g., see the local versions of the ANN 106a and 106b) as a result of the local training (e.g., see training 122a and 122b) are transmitted to the cloud computing environment having the master version of the ANN (e.g., see cloud computing environment 109). The cloud computing environment having the master version of the ANN combines the changes received from the mobile devices of different users having the different and local versions of the ANN (e.g., see mobile devices 105a and 105b) to update the master version of the ANN (e.g., see the master version of the ANN 110) in the cloud computing environment 109 (e.g., see combining 128), such that the master version is generic and becomes more and more accurate over time.

The master version of the ANN (e.g., see the master version of the ANN 110) hosted by the cloud environment (e.g., see cloud computing environment 109) can be downloaded to the individual mobile devices (e.g., see mobile devices 105a and 105b) to update the mobile devices capability to benefit from advances in areas that may not have been trained locally (e.g., see downloading 130a and 130b). Also, the downloaded ANN can be further trained locally for a customized version of the ANN for the user (e.g., see training 122a and 122b combined with the downloading 130a and 130b respectively).

Figure 3:
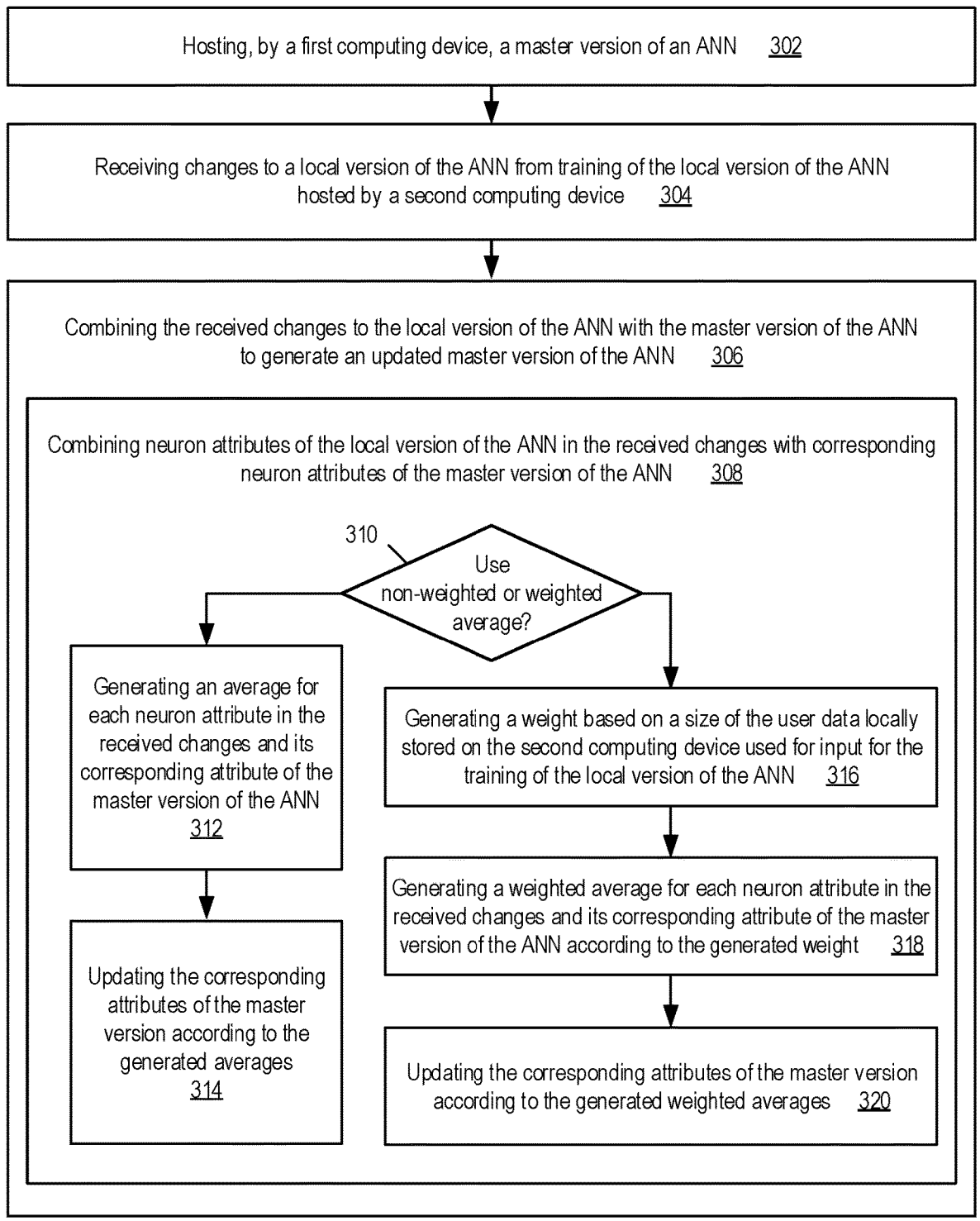
FIGS. 3 and 4 illustrate example methods performed by example parts of computer network 100 that can implement combining differently trained versions of the ANN into a master version of the ANN, in accordance with some embodiments of the present disclosure.
Figure 4:
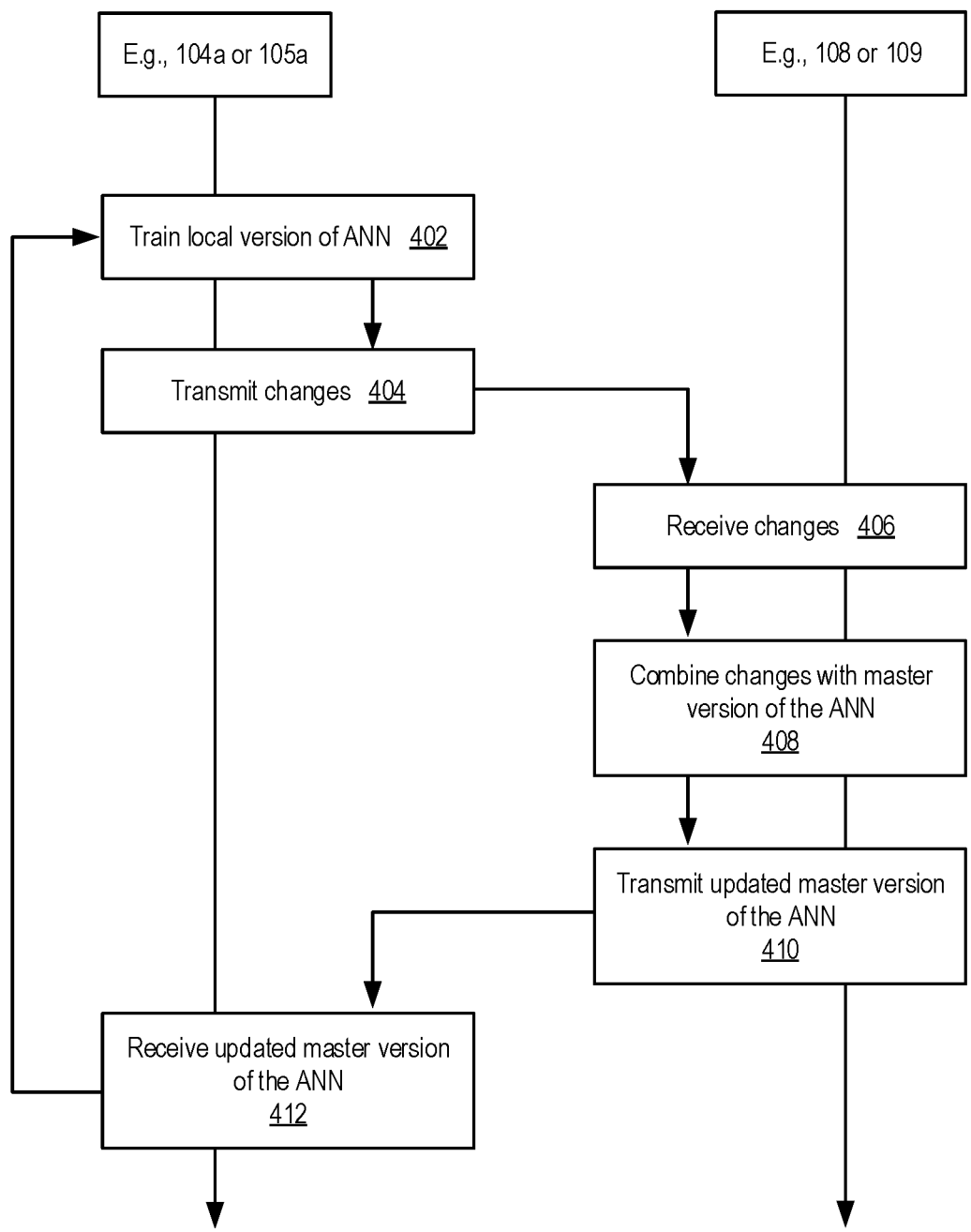

FIGS. 3 and 4 illustrate example methods performed by example parts of computer network 100 that can implement combining differently trained versions of an ANN into a master version of the ANN, in accordance with some embodiments of the present disclosure.

FIG. 3 shows the method 300 performed by one or more computing devices configured to host and execute a master version of an ANN (e.g., see first computing device 108 and the master version of the ANN 110 depicted in FIG. 1) that is in communication with other computing devices that can host and execute other versions of the ANN (e.g., see computing devices 104a and 104b of the set of computing devices 102 and the local versions of the ANN 106a and 106b).

The method 300 begins, at step 302, with hosting, by a first computing device (e.g., see first computing device 108), a master version of the ANN (e.g., see the master version of the ANN 110). At step 304, the first computing device receives changes to a local version of the ANN (e.g., see changes 126a and 126b as well as the local versions of the ANN 106a and 106b) from training of the local version of the ANN hosted by a second computing device (e.g., see training 122a and 122b). In some embodiments, the first computing device is part of a distributed network of computers forming a cloud computing environment, and the second computing device is a mobile device (e.g., see FIG. 2). And, in some embodiments, the training of the local version of the ANN by the second computing device (e.g., see computing devices 104a and 104b) includes inputting user data locally stored in the second computing device (e.g., see user data 120a and 120b). And, in such examples, the user data locally stored in the second computing device is not accessible by the first computing device (e.g., see first computing device 108). Further, in some embodiments, at least some of the user data locally stored in the second computing device is only accessible by the second computing device.

At step 306, the first computing device (e.g., see first computing device 108) combines the received changes to the local version of the ANN (e.g., see changes 126a and 126b) with the master version of the ANN (e.g., see the master version of the ANN 110) to generate an updated master version of the ANN (e.g., see combining 128 depicted in FIG. 1 as well).

As shown at step 308, the combining the received changes to the local version of the ANN with the master version of the ANN at step 306 includes combining neuron attributes of the local version of the ANN in the received changes with corresponding neuron attributes of the master version of the ANN.

As shown at step 312, when it is decided to use a non-weighted average at step 310, the combining neuron attributes of the local version of the ANN with corresponding neuron attributes of the master version of the ANN at step 308 can include generating an average for each neuron attribute of the local version in the changes and its corresponding attribute of the master version of the ANN. And, as shown at step 314, the combining neuron attributes of the local version of the ANN with corresponding neuron attributes of the master version of the ANN at step 308 can include updating the corresponding attributes of the master version according to the generated averages. For example, the combining neuron attributes of the local version of the ANN with corresponding neuron attributes of the master version of the ANN at step 308 can include replacing the corresponding attributes of the master version with the generated averages.

In some embodiments, the combining neuron attributes of the local version of the ANN with corresponding neuron attributes of the master version of the ANN at step 308 can include averaging weights for neuron inputs of the local version of the ANN with corresponding weights for neuron inputs of the master version of the ANN. In some embodiments, the combining neuron attributes of the local version of the ANN with corresponding neuron attributes of the master version of the ANN at step 308 can include averaging weights for neuron thresholds of the local version of the ANN with corresponding weights for neuron thresholds of the master version of the ANN. In some embodiments, the combining neuron attributes of the local version of the ANN with corresponding neuron attributes of the master version of the ANN at step 308 can include averaging weights for neuron inputs and thresholds of the local version of the ANN with corresponding weights for neuron inputs and thresholds of the master version of the ANN.

As shown at step 316, when it is decided to use a weighted average at step 310, combining neuron attributes of the local version of the ANN with corresponding neuron attributes of the master version of the ANN at step 308 can include generating a weight based on a size of the user data locally stored in the second computing device used for input for the training of the local version of the ANN. As shown at step 318, combining neuron attributes of the local version of the ANN with corresponding neuron attributes of the master version of the ANN at step 308 can include generating a weighted average for each neuron attribute of the local version in the changes and its corresponding attribute of the master version of the ANN according to the generated weight. As shown at step 320, combining neuron attributes of the local version of the ANN with corresponding neuron attributes of the master version of the ANN at step 308 can include updating the corresponding attributes of the master version according to the generated weighted averages. For example, the combining neuron attributes of the local version of the ANN with corresponding neuron attributes of the master version of the ANN at step 308 can include replacing the corresponding attributes of the master version with the generated weighted averages.

FIG. 4 shows the method 400 performed by computing devices configured to host and execute a master version of an ANN (e.g., see first computing device 108 and cloud computing environment 109 depicted in FIGS. 1 and 2 respectively) and computing devices configured to host and execute other versions of the ANN (e.g., see computing devices 104a and 104b or mobile devices 105a and 105b). Method 400 can include the operations of method 300.

The method 400 begins, at step 402, with training, by a second computing device hosting one of the other versions of the ANN (e.g., see computing devices 104a and 104b or mobile devices 105a and 105b), a local version of the ANN stored and executed in the second computing device (e.g., see the local versions of the ANN 106a and 106b).

At step 404, the second computing device (e.g., see computing devices 104a and 104b or mobile devices 105a and 105b) transmits changes to the local version of the ANN (e.g., see changes 126a and 126b) resulting from the training of the local version of the ANN (e.g., see training 122a and 122b).

At step 406, a first computing device (e.g., see first computing device 108 and cloud computing environment 109), hosting the master version of the ANN (e.g., see the master version of the ANN 110), receives the changes to the local version of the ANN. At step 408, the first computing device combines the changes with the master version of the ANN (e.g., see changes 126a and 126b and combining 128). The combining that occurs at step 408 includes updating of the master ANN. And, the combining at the step 408 can include one or more of the steps 308 to 320 illustrated in FIG. 3. At step 410, the first computing device transmits the updated master version of the ANN to the second computing device (e.g., also see downloading 130a and 130b).

The combining at step 408 can be in the form of updating neuron attributes and/or connectivity of the ANN. At step 408, changes to versions of the ANN (e.g., see changes 126a and 126b) can be combined with the master version of the ANN (e.g., see the master version of the ANN 110) by combining neuron attributes (e.g., weights for different inputs and thresholds) of the different versions of the ANN. The combining at step 408 can be done by taking averages for each attribute in the changes or in the ANN in general and/or weighted averages for each attribute in the changes or in the ANN in general. Weights for a weighted average in combining the changes from different contributors (e.g., different user devices) at step 408 can be configured on some measurements of sample sizes of the user data (e.g., see user data 120a and 120b). For example, if a user device's ANN is trained with more user data, its changes can be given more weight. Also, at step 408, connectivity changes can be combined via weights on outputs from neurons as inputs to other neurons (e.g., no connection is equivalent to zero weight).

For the purposes of steps 402 to 412 of FIG. 4 and this disclosure, it is to be understood that the changes to a local version of an ANN (e.g., see changes 126a and 126b) that are transmitted from the user devices (e.g., see computing devices 104a and 104b or mobile devices 105a and 105b shown in FIG. 2) to the central device, server, or cloud (e.g., see first computing device 108 or cloud computing environment 109) hosting the master version of the ANN at step 404 can be in the form of the entire changed ANN, parts of the changed ANN, or just the changed parameters in the changed ANN. Also, in some embodiments, the central device, server, or cloud hosting the master version of the ANN can limit what the user devices can change via local training at step 402, and this can reduce the data traffic but may also reduce the effectiveness of training.

Also, it is to be understood that a peer-to-peer network can implement the method 400. In such examples, a first selected device hosts the master version of the ANN for processing and the other devices of the peer-to-peer network host the other versions (e.g., local versions) of the ANN for processing. In such examples, the first selected device executes steps 406 to 410 and the other devices of the peer-to-peer network execute steps 402, 404, and 412.

At step 412, the second computing device receives the updated master version of the ANN. With the updated master version of the ANN, the second computing device can update its local version of the ANN according to the updated master version of the ANN. For example, the second computing device can replace its local version of the ANN with the received updated master version of the ANN. Also, as shown, subsequent to receiving the updated master version of the ANN and changing the local version of the ANN accordingly, the updated local version can be re-trained at step 402.

The training or re-training at step 402 can include a combining of the updated master version with a present local version of the ANN in the user device. And, the combining in the training or re-training at step 402 can include similar steps as steps 308 to 320 depicted in FIG. 3, except the updating at steps 314 and 320 include updates to the corresponding attributes of the local version of the ANN instead of updates to the corresponding attributes of the master version of the ANN. And, for example, the combining the received changes to the master version of the ANN with the local version of the ANN during the training or re-training at step 402 includes combining neuron attributes of the updated master version of the ANN in the received download (e.g., see downloading 130a and 130b) with corresponding neuron attributes of the local version of the ANN (e.g., see the local versions of the ANN 106a and 106b).

With respect to the method 300, method 400, or any other method, process, or operation described herein, in some embodiments, a non-transitory computer-readable storage medium stores instructions that, when executed by at least one processing device (such as processor 506 shown in FIG. 5), cause the at least one processing device to perform the method 300, method 400, or any other method, process, or operation described herein, and/or any combination thereof.

Figure 5:
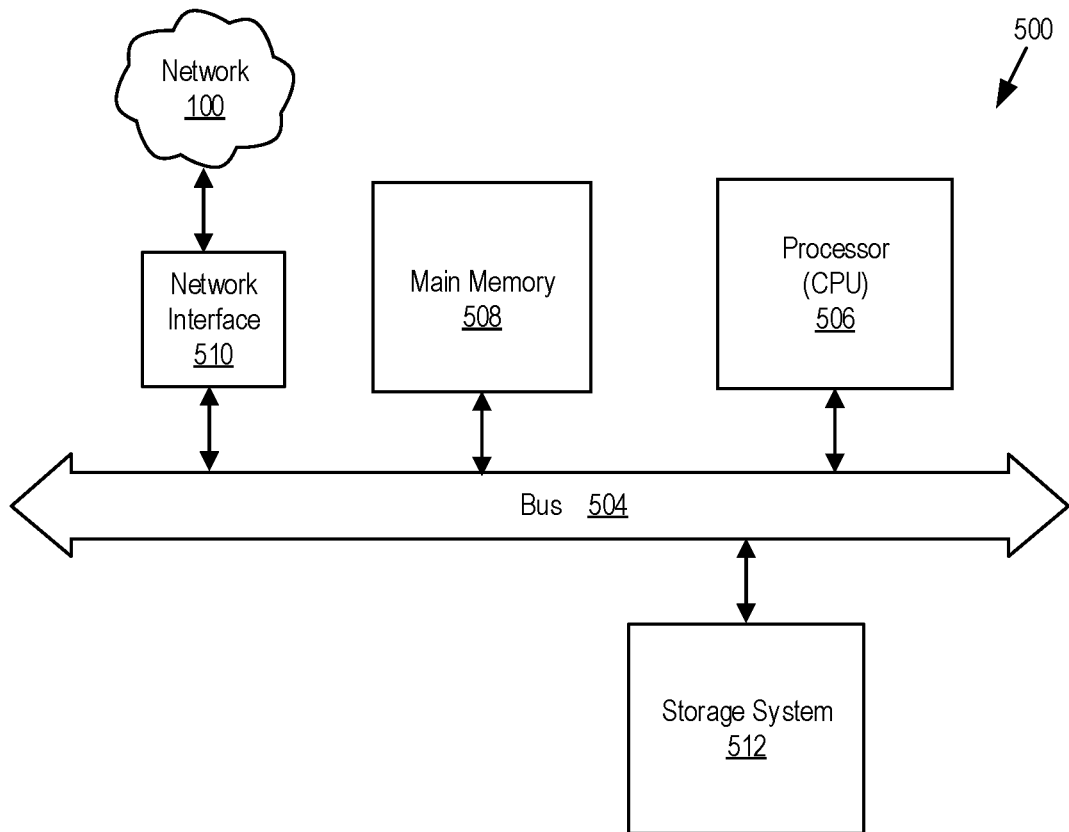
FIG. 5 illustrates an example computing device that can host a master version of the ANN or an example computing device that can host another version of the ANN, in accordance with some embodiments of the present disclosure.

FIG. 5 illustrates example parts of an example computing device 500, in accordance with some embodiments of the present disclosure. The computing device 500 can be communicatively coupled to other computing devices via the computer network 100 as shown in FIG. 5. In some embodiments, computing device 500 is the first computing device 108 or one or more computing devices of the cloud computing environment 109. In such embodiments, another instance of the computing device 500 is one of the computing devices of the set of computing devices 102 (e.g., see computing devices 104a and 104b and mobile devices 105a and 105b). The computing device 500 includes at least a bus 504, a processor 506 (such as a CPU), a main memory 508, a network interface 510, and a data storage system 512. The bus 504 communicatively couples the processor 506, the main memory 508, the network interface 510, and the data storage system 512. The computing device 500 includes a computer system that includes at least processor 506, main memory 508 (e.g., read-only memory (ROM), flash memory, dynamic random access memory (DRAM) such as synchronous DRAM (SDRAM) or Rambus DRAM (RDRAM), static random access memory (SRAM), etc.), and data storage system 512, which communicate with each other via bus 504 (which can include multiple buses).

To put it another way, FIG. 5 is a block diagram of an example computing device 500 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 510) to other machines in a LAN, an intranet, an extranet, and/or the Internet. The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Processor 506 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processor 506 can also be one or more special-purpose processing devices such as an application specific integrated circuit (ASIC), a field programmable gate array (FPGA), a digital signal processor (DSP), network processor, a processor in memory (PIM), or the like. Processor 506 is configured to execute instructions for performing the operations and steps discussed herein. Processor 506 can further include a network interface device such as network interface 510 to communicate over one or more communications network.

The data storage system 512 can include a machine-readable storage medium (also known as a computer-readable medium) on which is stored one or more sets of instructions or software embodying any one or more of the methodologies or functions described herein. The instructions can also reside, completely or at least partially, within the main memory 508 and/or within the processor 506 during execution thereof by the computer system, the main memory 508 and the processor 506 also constituting machine-readable storage media. While the memory, processor, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The peer-to-peer network of some embodiments can be a collection of nodes and peer-to-peer connections. For example, the first computing device 108 or one of computing devices of the set of computing devices 102 can be a node of a peer-to-peer network supported by computing devices connected through computer network 100.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   hosting, by a first computing device, a master version of an artificial neural network (ANN);
   receiving, by the first computing device, first changes to a first local version of the ANN from training of the first local version of the ANN hosted by a second computing device;
   receiving, by the first computing device, second changes to a second local version of the ANN from training of the second local version of the ANN hosted by a third computing device; and
   combining, by the first computing device, the first changes to the first local version of the ANN and the second changes to the second local version of the ANN with the master version of the ANN to generate an updated master version of the ANN, wherein:
      the first changes are different from the second changes; and
      combining the received changes to the local version of the ANN with the master version of the ANN comprises combining neuron attributes of the local version of the ANN in the received changes with corresponding neuron attributes of the master version of the ANN by:
         generating a weighted average for each neuron attribute of the local version in the changes and its corresponding attribute of the master version according to a generated weight;
         generating the generated weight based on a size of the user data locally stored in the second computing device used for input for the training of the local version of the ANN; and
         updating the corresponding attributes of the master version according to the generated weighted averages.

2. The method of claim 1, wherein the first computing device is part of a distributed network of computers forming a cloud computing environment, and wherein the second computing device is a mobile device.

3. The method of claim 1, wherein the training of the local version of the ANN comprises inputting user data locally stored in the second computing device, and wherein the user data locally stored in the second computing device is not accessible by the first computing device.

4. The method of claim 3, wherein at least some of the user data locally stored in the second computing device is only accessible by the second computing device.

5. The method of claim 1, wherein combining neuron attributes of the local version of the ANN with corresponding neuron attributes of the master version of the ANN comprises averaging weights for neuron inputs of the local version of the ANN with corresponding weights for neuron inputs of the master version of the ANN.

6. The method of claim 1, wherein combining neuron attributes of the local version of the ANN with corresponding neuron attributes of the master version of the ANN comprises averaging weights for neuron thresholds of the local version of the ANN with corresponding weights for neuron thresholds of the master version of the ANN.

7. The method of claim 1, wherein combining neuron attributes of the local version of the ANN with corresponding neuron attributes of the master version of the ANN comprises:
   generating an average for each neuron attribute of the local version in the changes and its corresponding attribute of the master version; and updating the corresponding attributes of the master version according to the generated averages.

8. An apparatus, comprising:
memory configured to store a master version of an artificial neural network (ANN);
a transceiver, configured to receive changes to a local version of the ANN from training of the local version of the ANN hosted by another apparatus; and
a processing device, configured to:
combine neuron attributes of the local version of the ANN in the with corresponding neuron attributes of the master version of the ANN to generate an updated master version of the ANN based on:
generation of a weighted average for each neuron attribute of the local version in the changes and its corresponding attribute of the master version according to a generated weight;
generation of the generated weight based on a size of the user data locally stored in the another apparatus used for input for the training of the local version of the ANN; and
update the corresponding attributes of the master version according to the generated weighted averages.

9. The apparatus of claim 8, wherein the training of the local version of the ANN comprises inputting user data locally stored on the other apparatus, and wherein the user data locally stored on the other apparatus is not accessible by the apparatus.

10. The apparatus of claim 9, wherein at least some of the user data locally stored on the other apparatus is only accessible by the other apparatus.

11. The apparatus of claim 8, wherein, in the configuration to combine the neuron attributes of the local version of the ANN with the corresponding neuron attributes of the master version of the ANN, the processing device is configured to average weights for neuron inputs of the local version of the ANN with corresponding weights for neuron inputs of the master version of the ANN.

12. The apparatus of claim 8, wherein, in the configuration to combine the neuron attributes of the local version of the ANN with the corresponding neuron attributes of the master version of the ANN, the processing device is configured to average weights for neuron thresholds of the local version of the ANN with corresponding weights for neuron thresholds of the master version of the ANN.

13. The apparatus of claim 12, wherein, in the configuration to combine the neuron attributes of the local version of the ANN with the corresponding neuron attributes of the master version of the ANN, the processing device is further configured to average weights for neuron inputs of the local version of the ANN with corresponding weights for neuron inputs of the master version of the ANN.

14. The apparatus of claim 8, wherein, in the configuration to combine the neuron attributes of the local version of the ANN with the corresponding neuron attributes of the master version of the ANN, the processing device is configured to:
generate an average for each neuron attribute of the local version in the changes and its corresponding attribute of the master version; and
update the corresponding attributes of the master version according to the generated averages.

15. A system, comprising:
a first computing device comprising a first mobile device, the first device further comprising:
first memory, configured to store a first local version of an artificial neural network (ANN);
a first processing device, configured to train the first local version of the ANN; and
a first transceiver, configured to transmit first changes to the first local version of the ANN generated from the training of the first local version of the ANN;
a second computing device comprising a second mobile device, the second device further comprising:
second memory, configured to store a second local version of an artificial neural network (ANN);
a second processing device, configured to train the second local version of the ANN; and
a second transceiver, configured to transmit second changes to the second local version of the ANN generated from the training of the second local version of the ANN; and
a third computing device comprising at least one server that is a part of a distributed network of computers forming a cloud computing environment, the third computing device further comprising:
third memory configured to store a master version of the ANN;
a third transceiver, configured to receive:
from the first computing device, the first changes to the first local version of the ANN from training of the first local version of the ANN; and
from the second computing device, the second changes to the second local version of the ANN from training of the second local version of the ANN, wherein the second changes are different from the first changes; and
a third processing device, configured to combine the first changes and the second changes with the master version of the ANN to generate an updated master version of the ANN, wherein the combining comprises combining first neuron attributes of the first local version of the ANN in the first changes and second neuron attributes of the second local version of the ANN with corresponding neuron attributes of the master version of the ANN by:
generating a weighted average for each neuron attribute of the local version in the changes and its corresponding attribute of the master version according to a generated weight;
generating the generated weight based on a size of the user data locally stored in the second computing device used for input for the training of the local version of the ANN; and
updating the corresponding attributes of the master version according to the generated weighted averages.

16. The method of claim 1, wherein the first computing device is specially constructed to host the master version of the ANN and to combine the received changes to the local version of the ANN with the master version of the ANN to generate an updated master version of the ANN.

17. The method of claim 1, wherein the local version of the ANN does not contain private information related to a user of the second computing device.

18. The method of claim 17, wherein the master version of the ANN does not contain private information related to the user of the second computing device, such that the updated master version of the ANN also does not contain private information related to the user of the second computing device.

19. The system of claim 15, wherein:
the first processing device is configured to train the first local version of the ANN using first user data, wherein the first user data is generated by a first user of the first computing device; and
the second processing device is configured to train the second local version of the ANN using second user data, wherein the second user data is generated by a second user of the second computing device.

20. The method of claim 1, wherein the first changes transmitted to the third computing device do not contain the first user data, and the second changes transmitted to the third computing device do not contain the second user data.

* * * * *